United States Patent
Wong et al.

(10) Patent No.: US 9,788,322 B2
(45) Date of Patent: Oct. 10, 2017

(54) RANDOM ACCESS RESPONSE POSITION INDICATION FOR COVERAGE ENHANCED LOW COMPLEXITY MACHINE TYPE COMMUNICATION

(71) Applicants: Shin Horng Wong, Chippenham (GB); Sigen Ye, New Providence, NJ (US); Seau Sian Lim, Swindon (GB); David Bhatoolaul, Swindon (GB)

(72) Inventors: Shin Horng Wong, Chippenham (GB); Sigen Ye, New Providence, NJ (US); Seau Sian Lim, Swindon (GB); David Bhatoolaul, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/690,444

(22) Filed: Apr. 19, 2015

(65) Prior Publication Data
US 2016/0309475 A1 Oct. 20, 2016

(51) Int. Cl.
*H04W 72/04* (2009.01)
*H04W 74/00* (2009.01)
(Continued)

(52) U.S. Cl.
CPC ....... *H04W 72/0453* (2013.01); *H04W 4/005* (2013.01); *H04W 72/121* (2013.01);
(Continued)

(58) Field of Classification Search
None
See application file for complete search history.

(56) References Cited

U.S. PATENT DOCUMENTS

2010/0331003 A1* 12/2010 Park ................. H04W 74/0866
455/450
2013/0250888 A1 9/2013 Lu
(Continued)

FOREIGN PATENT DOCUMENTS

WO WO-2015/012666 A1 1/2015
WO WO-2015/019045 A1 2/2015

OTHER PUBLICATIONS

Office Action and Search Report dated May 16, 2017 for Taiwan Application No. 105110133.
(Continued)

*Primary Examiner* — Mohamed Kamara
*Assistant Examiner* — George Atkins, Jr.
(74) *Attorney, Agent, or Firm* — Harness, Dickey & Pierce, P.L.C.

(57) ABSTRACT

A base station includes a processing circuit and a transceiver. The processing circuit includes a scheduler configured to: schedule a plurality of physical downlink shared channel transmissions in parallel, a first physical downlink shared channel transmission, among the plurality of physical downlink shared channel transmissions, including a random access response for a first user equipment, and the plurality of physical downlink shared channel transmissions being scheduled for transmission to a plurality of user equipments during a random access response window. The transceiver circuit is configured to transmit the plurality of physical downlink shared channel transmissions to the plurality of user equipments during the random access response window.

19 Claims, 8 Drawing Sheets

(51) Int. Cl.
*H04W 4/00* (2009.01)
*H04W 72/12* (2009.01)
*H04W 74/08* (2009.01)

(52) U.S. Cl.
CPC ...... *H04W 74/006* (2013.01); *H04W 72/1289* (2013.01); *H04W 74/008* (2013.01); *H04W 74/0833* (2013.01)

(56) References Cited

U.S. PATENT DOCUMENTS

| | | | | |
|---|---|---|---|---|
| 2013/0279451 | A1* | 10/2013 | Park | H04W 48/08 |
| | | | | 370/329 |
| 2013/0301608 | A1 | 11/2013 | Frenne et al. | |
| 2014/0169324 | A1* | 6/2014 | Seo | H04L 5/001 |
| | | | | 370/329 |
| 2015/0078224 | A1* | 3/2015 | Xiong | H04L 1/1887 |
| | | | | 370/280 |
| 2015/0326995 | A1* | 11/2015 | Li | H04W 74/08 |
| | | | | 370/329 |
| 2016/0037550 | A1* | 2/2016 | Barabell | H04B 17/318 |
| | | | | 455/450 |
| 2016/0165640 | A1* | 6/2016 | Yang | H04W 4/005 |
| | | | | 370/336 |

OTHER PUBLICATIONS

International Search Report dated Aug. 9, 2016 in International Application No. PCT/IB2016/000651.

\* cited by examiner

US 9,788,322 B2

RANDOM ACCESS RESPONSE POSITION INDICATION FOR COVERAGE ENHANCED LOW COMPLEXITY MACHINE TYPE COMMUNICATION

BACKGROUND

A Machine Type Communication (MTC) device is a user equipment (UE) that is used by a machine for specific application. In $3^{rd}$ Generation Partnership Project Long Term Evolution (3GPP-LTE) Release 12 (Rel-12), a work item (WI) on Low Complexity MTC (LC-MTC) UEs was concluded in which the complexity and cost of MTC UEs were reduced by approximately 50%. In Release 13 (Rel-13), another WI was agreed upon to further reduce complexity, enhance coverage and improve power consumption of MTC UEs.

One complexity and cost reduction technique is to reduce the radio-frequency (RF) bandwidth of LC-MTC UEs to 1.4 MHz (operating with 6 Physical Resource Blocks (PRBs), where a PRB is a unit of resource allocation in the frequency domain).

For a coverage enhancement (CE) aspect of this WI, one technique for reducing complexity and cost is repetition of the physical channel. However, it is expected that the number of repetitions will be relatively high (e.g., hundreds of repetitions), which may impact spectra efficiency.

SUMMARY

At least one example embodiment provides a base station including a processing circuit and a transceiver connected to the processing circuit. The processing circuit includes a scheduler configured to: schedule a plurality of physical downlink shared channel transmissions in parallel, a first physical downlink shared channel transmission, among the plurality of physical downlink shared channel transmissions, including a random access response for a first user equipment, and the plurality of physical downlink shared channel transmissions being scheduled for transmission to a plurality of user equipments during a random access response window. The transceiver circuit is configured to transmit the plurality of physical downlink shared channel transmissions to the plurality of user equipments during the random access response window.

At least one other example embodiment provides a base station including a processing circuit and a transceiver connected to the processing circuit. The processing circuit includes a scheduler configured to: schedule a plurality of physical downlink shared channel transmissions for a plurality of user equipments in response to preambles received from the plurality of user equipments on a random access channel, the scheduled physical downlink shared channel transmissions including random access responses for the plurality of user equipments, and the plurality of physical downlink shared channel transmissions being scheduled for transmission during a random access response window; assign wireless resources to carry physical downlink control channel transmissions for the plurality of user equipments as a function of at least one of (i) the preambles received from the plurality of user equipments and (ii) random access channel resources used by the plurality of user equipments to transmit the preambles, the plurality of physical downlink control channel transmissions corresponding to the scheduled plurality of physical downlink shared channel transmissions. The transceiver circuit is configured to send the plurality of physical downlink shared channel transmissions and the corresponding physical downlink control channel transmissions to the plurality of user equipments during the random access response window.

At least one other example embodiment provides a user equipment including a processing circuit and a transceiver connected to the processing circuit. The processing circuit is configured to: determine a position of a random access response message for the user equipment within a random access response window based on downlink control information for the user equipment received on a physical downlink control channel; and decode the random access response message at the determined position within the random access response window to obtain a random access response for the user equipment. The transceiver is configured to establish a radio resource connection based on the obtained random access response. The random access response message may be transmitted on a physical downlink shared channel corresponding to the physical downlink control channel.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
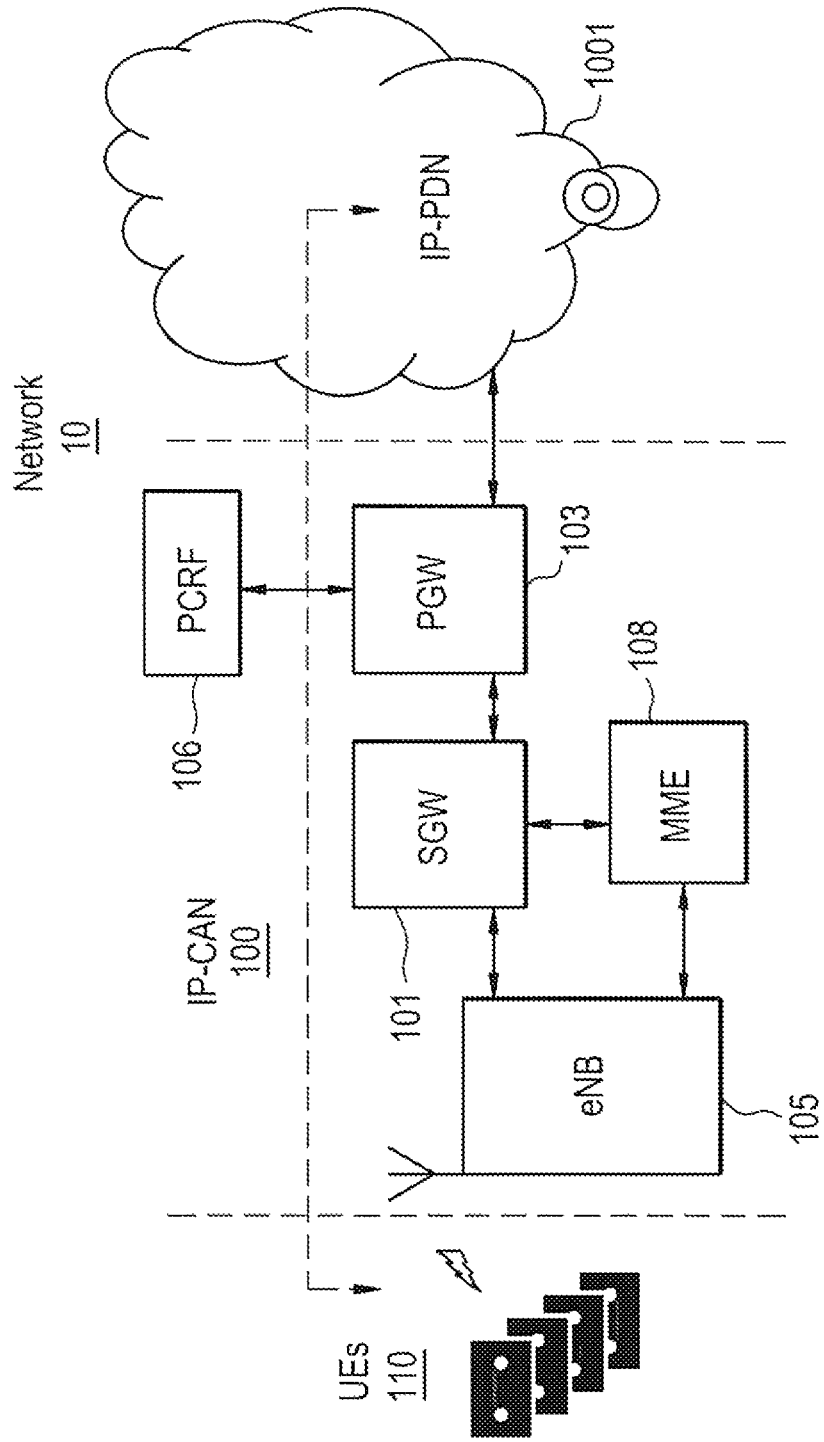
FIG. 1 illustrates a $3^{rd}$ Generation Partnership Project Long-Term Evolution (3GPP LTE) network.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing small wireless cells, base stations, NodeBs, user equipments (UEs) including LC-MTC UEs, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), macro cell, etc., and describes a device in communication with and providing wireless resources to UEs in a geographical coverage area. As discussed herein, eNBs may have all functionally associated with conventional, well-known base stations in addition to the capability and functionality discussed herein.

As used herein, the term "small wireless cell" may be considered synonymous to, and may hereafter be occasionally referred to as a micro cell, pico cell, Home NodeB (HNB), Home eNodeB (HeNB), etc., and describes a device in communication with and providing wireless resources (e.g., LTE, 3G, WiFi, etc.) to users in a geographical coverage area that is, in most cases, smaller than the geographical coverage area covered by a macro eNB or cell. As discussed herein, small wireless cells may have all functionally associated with conventional, well-known base stations in addition to the capability and functionality discussed herein. In this regard, the small wireless cells may include a base station or eNB. Small wireless cells according to at least some example embodiments may also serve as WLAN (or WiFi) access points (APs) providing WLAN (or WiFi) resources for devices within range of the small wireless cell. Although discussed with regard to macro eNBs, example embodiments may also be applicable to small wireless cells and base stations.

Generally, as discussed herein, a small wireless cell may be any well-known small wireless cell including one or more processors, various communication interfaces (e.g., LTE, WiFi and wired), a computer readable medium, memories, etc. The one or more interfaces may be configured to transmit/receive data signals via wireless connections over a WiFi and a cellular network to/from one or more other devices, and also communicate with the Internet, for example over a wired connection.

The term "user equipment" or "UE", as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a $3^{rd}$ Generation Partnership Project Long-Term Evolution (3GPP LTE) network). The UEs discussed herein may be low complexity machine type communication (LC-MTC) UEs capable of operating in coverage enhanced (CE) and/or non-coverage enhanced (non-CE) modes.

According to example embodiments, UEs, small wireless base stations (or cells), eNBs, etc. may be (or include) hardware, firmware, hardware executing software, or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs), computers, or the like, configured as special purpose machines to perform the functions described herein as well as any other well-known functions of these elements. In at least some cases, CPUs, SOCs, DSPs, ASICs and FPGAs may collectively be referred to as processing circuits, processors and/or microprocessors.

FIG. 1 illustrates a 3GPP LTE network 10.

Referring to FIG. 1, the network 10 includes an Internet Protocol (IP) Connectivity Access Network (IP-CAN) 100 and an IP Packet Data Network (IP-PDN) 1001. The IP-CAN 100 includes: a serving gateway (SGW) 101; a packet data network (PDN) gateway (PGW) 103; a policy and charging rules function (PCRF) 106; a mobility management entity (MME) 108 and eNode B (eNB) 105. Although not shown in FIG. 1, the IP-PDN 1001 portion of an evolved packet system (EPS) may include application and/or proxy servers, media servers, email servers, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, the PCRF 106, and the MME 108 is referred to as the Evolved Packet Core (EPC).

Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

Still referring to FIG. 1, the eNB 105 provides wireless resources and radio coverage for one or more user equipments (UEs) 110. That is to say, any number of UEs 110 may be connected (or attached) to the eNB 105 to access wireless network services and resources. The eNB 105 is operatively coupled to the SGW 101 and the MME 108. Additional functionality of the eNB 105 and the UEs 110 will be discussed in more detail later.

The SGW 101 routes and forwards user data packets, while also acting as the mobility anchor for the user plane during inter-eNB handovers of UEs. The SGW 101 also acts as the anchor for mobility between 3GPP LTE and other 3GPP technologies. For idle UEs, the SGW 101 terminates the downlink data path and triggers paging when downlink data arrives for the idle UEs.

The PGW 103 provides connectivity between the UEs 110 and external packet data networks (e.g., the IP-PDN) by serving as the point of entry/exit of traffic for the UEs 110 to/from the IP-CAN 100. As is known, a given UE 110 may have simultaneous connectivity with more than one PGW 103 for accessing multiple PDNs.

Still referring to FIG. 1, eNB 105 is also operatively coupled to the MME 108. The MME 108 is the control-node for the EUTRAN, and is responsible for idle mode UE 110 paging and tagging procedures including retransmissions. The MME 108 is also responsible for choosing a particular SGW for a UE during initial attachment of the UE to the network, and during intra-LTE handover involving Core Network (CN) node relocation. The MME 108 authenticates UEs 110 by interacting with a Home Subscriber Server (HSS), which is not shown in FIG. 1.

Non Access Stratum (NAS) signaling terminates at the MME 108, and is responsible for generation and allocation of temporary identities for UEs 110. The MME 108 also checks the authorization of a UE 110 to camp on a service provider's Public Land Mobile Network (PLMN), and enforces UE 110 roaming restrictions. The MME 108 is the termination point in the network for ciphering/integrity protection for NAS signaling, and handles security key management.

The MME 108 also provides control plane functionality for mobility between LTE and 2G/3G access networks with an S3 type of interface from the SGSN (not shown) terminating at the MME 108.

Still referring to FIG. 1, the Policy and Charging Rules Function (PCRF) 106 is the entity that makes policy decisions and sets charging rules. It has access to subscriber databases and plays a role in the 3GPP architecture.

Figure 2:
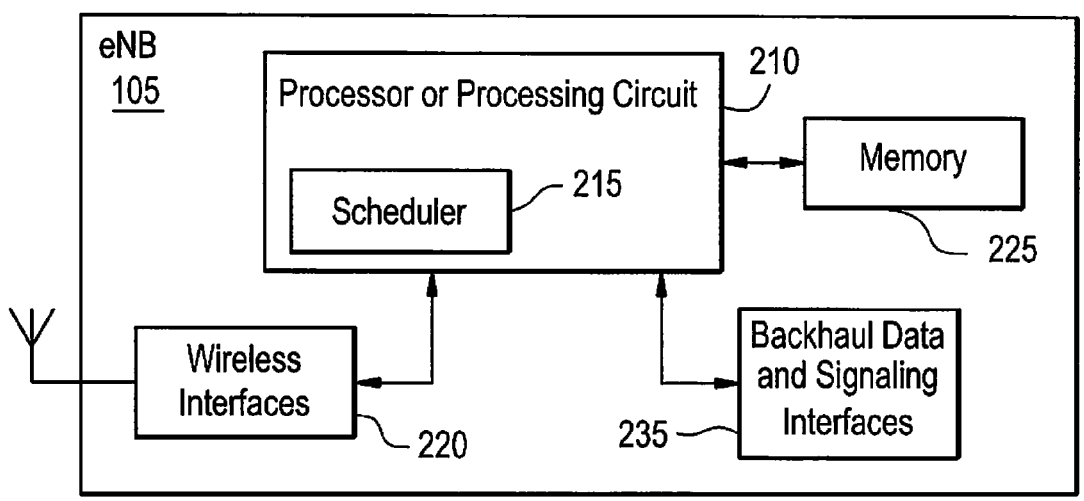
FIG. 2 illustrates an example eNodeB (eNB).

FIG. 2 illustrates an example of the eNB 105 shown in FIG. 1.

Referring to FIG. 2, the eNB 105 includes: a memory 225; a processor 210; a scheduler 215; wireless communication interfaces 220; and a backhaul data and signaling interfaces (referred to herein as backhaul interface) 235. The processor or processing circuit 210 controls the function of eNB 105 (as described herein), and is operatively coupled to the memory 225 and the communication interfaces 220. While only one processor 210 is shown in FIG. 2, it should be understood that multiple processors may be included in a typical eNB, such as the eNB 105. The functions performed by the processor may be implemented using hardware. As discussed above, such hardware may include one or more Central Processing Units (CPUs), digital signal processors (DSPs), application-specific-integrated-circuits, field programmable gate arrays (FPGAs) computers or the like. The term processor or processing circuit, used throughout this document, may refer to any of these example implementations, though the term is not limited to these examples.

Still referring to FIG. 2, the wireless communication interfaces 220 (also referred to as communication interfaces 220) include various interfaces including one or more transmitters/receivers (or transceivers) connected to one or more antennas to wirelessly transmit/receive control and data signals to/from the UEs 110, or via a control plane.

The backhaul interface 235 interfaces with the SGW 101, MME 108, other eNBs, or other EPC network elements and/or RAN elements within IP-CAN 100.

The memory 225 may buffer and store data that is being processed at eNB 105, transmitted and received to and from eNB 105.

Still referring to FIG. 2, the scheduler 215 schedules control and data communications that are to be transmitted and received by the eNB 105 to and from UEs 110. Additional functionality of the scheduler 215 and the eNB 105 will be discussed in more detail later.

Figure 3:
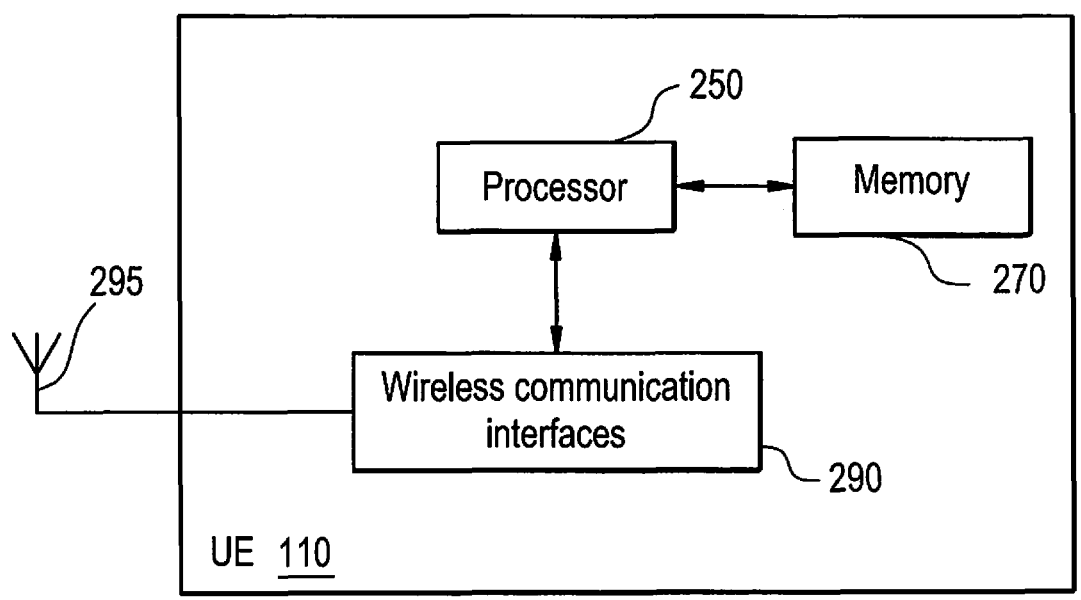
FIG. 3 illustrates an example embodiment of a user equipment (UE).

FIG. 3 illustrates an example of the UE 110 shown in FIG. 1.

Referring to FIG. 3, the UE 110 includes: a memory 270; a processor (or processing circuit) 250 connected to the memory 270; various interfaces 290 connected to the processor 250; and an antenna 295 connected to the various interfaces 290. The various interfaces 290 and the antenna 295 may constitute a transceiver for transmitting/receiving data from/to the eNB 105. As will be appreciated, depending on the implementation, the UE 110 may include many more components than those shown in FIG. 3. However, it is not necessary that all of these generally conventional components be shown in order to disclose the illustrative example embodiment.

The memory 270 may be a computer readable storage medium that generally includes a random access memory (RAM), read only memory (ROM), and/or a permanent mass storage device, such as a disk drive. The memory 270 also stores an operating system and any other routines/modules/applications for providing the functionalities of the UE 110 (e.g., functionalities of a UE, methods according to the example embodiments, etc.) to be executed by the processor 250. These software components may also be loaded from a separate computer readable storage medium into the memory 270 using a drive mechanism (not shown). Such separate computer readable storage medium may include a disc, tape, DVD/CD-ROM drive, memory card, or other like computer readable storage medium (not shown). In some embodiments, software components may be loaded into the memory 270 via one of the various interfaces 290, rather than via a computer readable storage medium.

The processor 250 may be configured to carry out instructions of a computer program by performing the arithmetical, logical, and input/output operations of the system. Instructions may be provided to the processor 250 by the memory 270.

The various interfaces 290 may include components that interface the processor 250 with the antenna 295, or other input/output components. As will be understood, the interfaces 290 and programs stored in the memory 270 to set forth the special purpose functionalities of the UE 110 will vary depending on the implementation of the UE 110.

When a UE (such as a UE 110 in FIG. 1) enters a coverage area of an eNB (such as the eNB 105 shown in FIG. 1), the UE attempts to establish a radio resource control (RRC) protocol connection (also referred to as a RRC connection) with the eNB to access the wireless network. As is known, the RRC protocol provides functions such as connection establishment and release functions, broadcast of system information, radio bearer establishment, reconfiguration and release, RRC connection mobility procedures, paging notification and release and outer loop power control. Through signaling functions, the RRC protocol configures the user and control planes according to status of the wireless network, and allows for implementation of Radio Resource Management strategies in the wireless network.

To initiate establishment of a RRC connection with the eNB, a UE sends a Random Access CHannel (RACH) preamble to the eNB in a first message (Msg1) via the Physical Random Access Channel (PRACH). As is known, the UE chooses the RACH preamble from among a set of 64 preamble sequences. The preamble sequence (or preamble ID) identifies the particular UE, including the type of UE and the identifier (UE ID) for the UE sending the preamble sequence. In one example, the preamble sequence may include a cyclic prefix, a sequence and a guard time. The preamble sequences may be defined from a Zadoff-Chu sequence. As discussed herein, the preamble sequence or ID may be referred to as a preamble or RACH preamble.

In response to receiving the preamble from the UE on the PRACH, the eNB sends a second message (Msg2) to the UE on the Physical Downlink Shared CHannel (PDSCH). In one example, the second message (Msg2) includes a Random Access Response (RAR) for the UE. The RAR for a particular UE may include a timing advance (TA) and Cell Radio Network Temporary Identifier (C-RNTI) for the UE, as well as an uplink (UL) grant for the UE to transmit a subsequent RRC connection request to the eNB.

The RAR for the UE is multiplexed together with RARs for other UEs from which the eNB has also received preambles concurrently, simultaneously, or within a given time window. In this regard, the RARs for multiple UEs are multiplexed into RAR messages (also referred to as RAR Protocol Data Units (PDUs), PDSCH transmissions or transmissions of the PDSCH), wherein each RAR message may include RARs for multiple different UEs. As discussed herein, the terms RAR messages, RAR PDUs and PDSCH transmissions may be used interchangeably.

Because the eNB is able to multiplex RARs for multiple different UEs in a single RAR message (or PDSCH transmission), the eNB also sends downlink control information (DCI) corresponding to each RAR message to a UE on the Enhanced Physical Downlink Control CHannel (EPDCCH) in an EPDCCH Common Search Space (CSS) subframe. The DCI provides control information (e.g., transport block size (TBS) and modulation and coding scheme (MCS)) for decoding the particular PDSCH transmission and RAR intended for a UE. DCI for multiple UEs may be multiplexed into a EPDCCH transmission (also referred to as a control channel message) to be transmitted to the UEs during the RA response window. As discussed herein, the terms control channel message and EPDCCH transmission may be used interchangeably.

In one conventional example, control channel messages including DCI for each UE are multiplexed with the RAR messages (e.g., in the time domain) for transmission to the UEs; that is, in this conventional example the eNB multiplexes EPDCCH and PDSCH transmissions to the UEs such that the UEs receive a control channel message prior to receiving a corresponding RAR message.

Even if only 1 RAR is included in a RAR message, the eNB still provides the subband/physical resource block (PRB) for the RAR message on the EPDCCH, unless the subband/PRB and the TBS and/or MCS is fixed in the specification or semi-statically configured in the system information blocks (SIB), which limits the scheduling flexibility at the eNB. In order to maintain the flexibility in scheduling RARs for UEs, the control channel messages may be transmitted on the EPDCCH prior to transmission of the corresponding RAR message on the PDSCH. In a bandwidth limited system, the different repetition levels (even if different PRACH resources are used) may share the same subband for the control channel messages.

For a specific repetition level, the eNB must be able to respond to preambles received from multiple different UEs (also referred to as PRACHs received from multiple different UEs) requesting access to the wireless network simultaneously, concurrently and/or within a given time window. Multiplexing of multiple RARs into an RAR message by the eNB may help in this respect.

However, the eNB may also desire to spread the allocation of resources for Message 3 messages (e.g., Radio Resource Control (RRC) connection requests) from the UEs, rather than responding to all received preambles in one particular instance. To facilitate this spreading of resources, 3GPP-LTE Release 8 (Rel-8) provides a random access (RA) response window in which the transmissions of RAR messages by the eNB are spread over a semi-statically configured period.

In coverage enhanced (CE) situations, proper reception of EPDCCH and PDSCH transmissions (e.g., including an RAR) at a UE requires numerous repetitions of each transmission. Since, conventionally, the DCI for a given PDSCH transmission to a UE is provided in a corresponding EPDCCH transmission, the PDSCH transmission (also sometimes referred to as PDSCH repetition or repetitions) begins only after the end of the corresponding EPDCCH transmissions (also sometimes referred to as EPDCCH repetition or repetitions). As a result, a conventional RA response window may include a sequence of EPDCCH repetitions followed by PDSCH repetitions for each RAR message.

Figure 5:
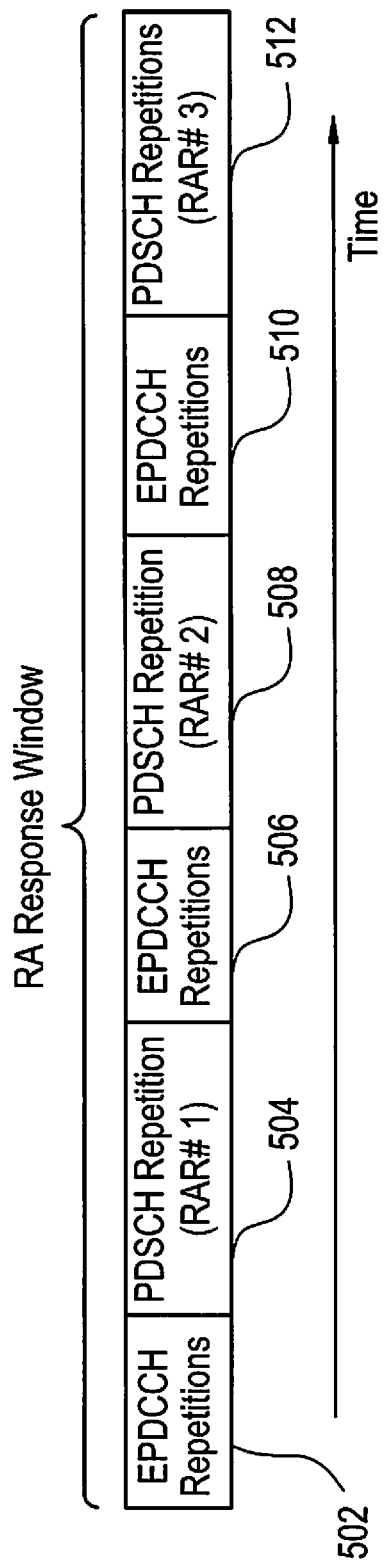
FIG. 5 illustrates an example sequence of Enhanced Physical Downlink Control CHannel (EPDCCH) repetitions followed by PDSCH repetitions for each RAR message in a random access (RA) response window.

FIG. 5 illustrates an example sequence of EPDCCH repetitions followed by PDSCH repetitions for each RAR message in a RA response window.

In the example shown in FIG. 5, three PDSCH transmissions (repetitions) 504, 508 and 512 and three EPDCCH transmissions (repetitions) 502, 506 and 510 are sent within the RA response window. As shown in this example, the respective PDSCH transmissions 504, 508 and 512 are interleaved among the EPDCCH transmissions 502, 506 and 510 within the RA response window.

Conventionally, until the UE (e.g., LC-MTC UE) locates its RAR, the UE blind decodes at least each of the EPDCCH transmissions within the RA response window to determine whether the corresponding PDSCH transmissions include a RAR intended for the UE. Such blind decoding, however, may result in substantial power consumption at the UE.

With regard to FIG. 5, for example, if each EPDCCH transmission 502, 506 and 510 requires 10 repetitions (e.g., 10 subframes) and the RAR for a particular UE is in PDSCH transmission 512 (or if eNB does not respond to the UE), then the UE must wake up for at least 30 subframes in order to receive all EPDCCH transmissions even though only the EPDCCH transmission 510 and the PDSCH transmission 512 are of any consequence to the UE.

One or more example embodiments may reduce power consumption at UEs during a RA response window. According to at least one example embodiment, the eNB schedules all PDSCH transmissions for transmission to UEs within the RA response window in parallel, rather than sequentially as in the conventional art. In this regard, the eNB schedules the PDSCH transmissions for UEs prior to transmitting the DCI for the UEs on the EPDCCH. The eNB then provides scheduling information for the PDSCH transmissions either explicitly or implicitly using the corresponding DCI carried on the EPDCCH (also referred to herein as a control channel transmissions or physical control channel transmissions). According to at least some example embodiments, the scheduling information indicates the position (e.g., a temporal position, such as a subframe) of a particular PDSCH transmission (including a RAR) intended for a UE within the RA response window.

According to at least one example embodiment, the EPDCCH transmissions are provided at the start of the RA response window, before transmission of the PDSCH to the UEs. By scheduling the PDSCH transmissions in parallel, the UEs need only perform blind decoding of the EPDCCH using their Random Access-Radio Network Temporary Identifiers (RA-RNTIs) once per RA response window, rather than multiple times (e.g., for each EPDCCH transmission) as in the conventional art.

Figure 6:
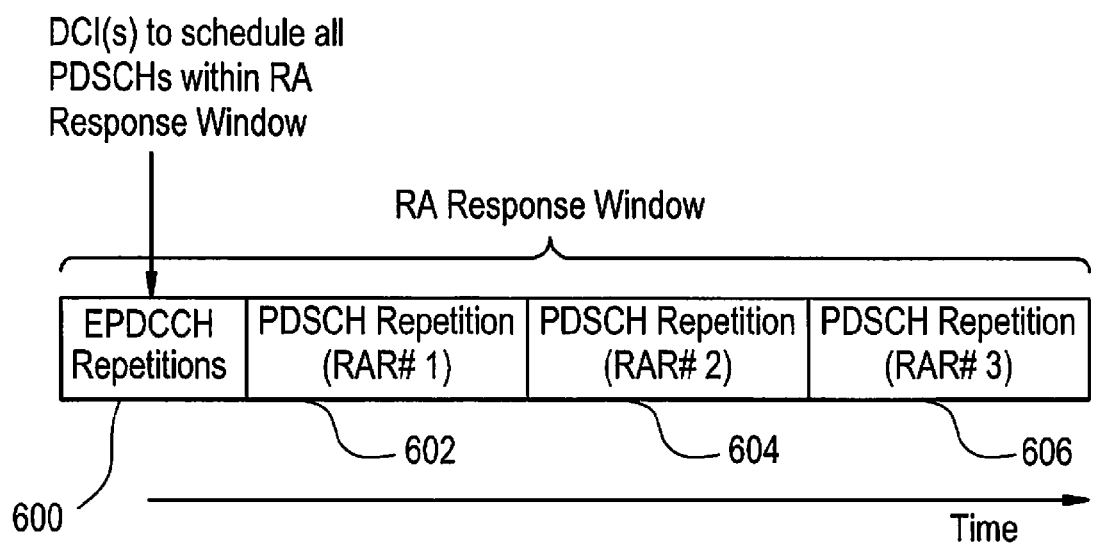
FIG. 6 illustrates example transmission of EPDCCH repetitions followed by a sequence of Physical Downlink Shared CHannel (PDSCH) repetitions in a random access (RA) response window, according to an example embodiment.

FIG. 6 illustrates example transmission of EPDCCH repetitions followed by a sequence of PDSCH repetitions in a RA response window, according to an example embodiment.

As shown in FIG. 6, parallel repetitions of the EPDCCH transmissions 600 including DCI (and scheduling information) for all subsequent PDSCH transmissions in the RA response window are transmitted at the beginning of the RA response window, and prior to PDSCH transmissions 602, 604 and 606 including RARs for the UEs.

In the example embodiment shown in FIG. 6, if each EPDCCH transmission requires 10 repetitions (e.g., 10 subframes) and the RAR for a particular UE is in the third PDSCH transmission 606 (or if eNB does not respond to the UE), then the UE need only wake up for the first 10 subframes to receive the EPDCCH transmissions, as opposed to the at least 30 subframes required in the conventional example shown in FIG. 5.

Example embodiments will now be described in more detail with regard to establishing a Radio Resource Control (RRC) connection between the UE 110 and the eNB 105 shown in FIGS. 1-3. Example embodiments, however, should not be limited to this example case.

Figure 4:
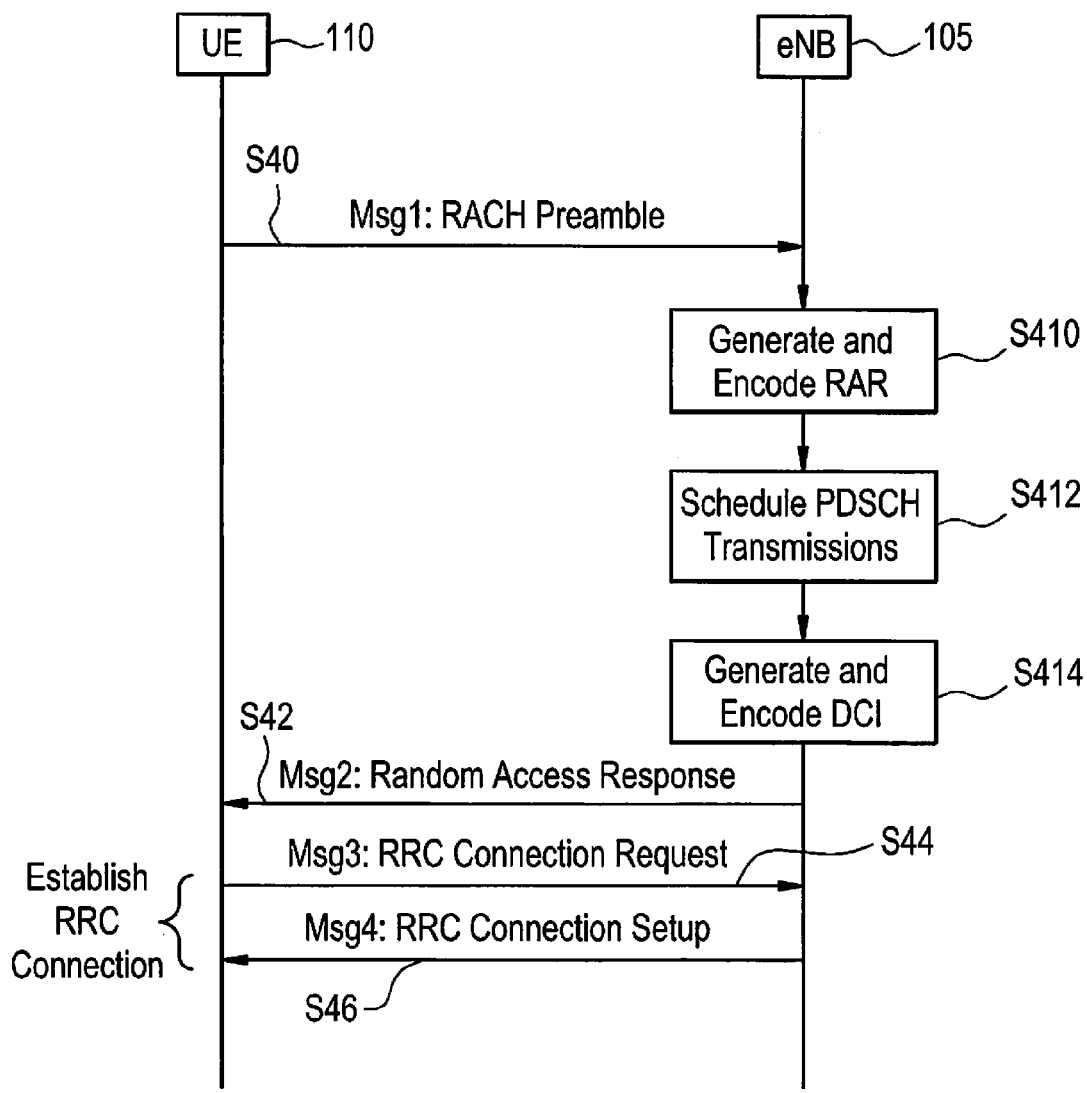
FIG. 4 is a signal flow diagram illustrating a method for establishing a radio resource control (RRC) connection between a UE and an eNB, according to an example embodiment.

FIG. 4 is a signal flow diagram illustrating an example embodiment of a method for establishing a radio resource control (RRC) connection between the UE 110 and the eNB 105 shown in FIGS. 1-3.

Referring to FIG. 4, to initiate establishment of a RRC connection with the eNB 105, at S40 the UE 110 sends a RACH preamble (Msg1) to the eNB 105 via the PRACH.

In response to receiving the RACH preamble (Msg1) from the UE 110, at S410 the scheduler 215 generates a RAR for the UE 110 to be transmitted to the UE 110 in a RAR message on the PDSCH. Because methods for generating RARs, and the information included therein, are well-known a detailed discussion is omitted. Also at S410, the scheduler 215 encodes the RAR for transmission to the UE 110 in a RAR message along with other RARs on the PDSCH. As discussed herein, a RAR message may also be referred to as a RAR PDU or a PDSCH transmission.

At S412, the scheduler 215 performs parallel scheduling of the PDSCH transmissions to the UEs in the RA response window. In so doing, the scheduler 215 determines a position (e.g., temporal position) of the PDSCH transmission to the UE 110 (e.g., among a plurality of PDSCH transmissions to UEs) in the RA response window. In one example, the scheduler 215 generates scheduling information including resource assignments, such as which resource block pairs are to be used to transmit the corresponding PDSCH transmission to the UE 110. The parallel scheduling of the PDSCH transmissions may be done in any suitable well-known manner. The scheduling information identifies the position of a PDSCH transmission to a UE within the RA response window. In one example, the scheduling information may identify one or more subframes within the RA response window carrying the PDSCH transmission for the UE 110.

At S414, the scheduler 215 generates downlink control information (DCI) for the RAR message generated at S410. The DCI includes power control commands, RACH commands, information for uplink grants for the physical uplink shared channel (PUSCH), etc. In addition, the generated DCI associated with the PDSCH transmission to the UE 110 is indicative of the scheduling information for the UE 110 generated at S412. As discussed in more detail later, the DCI may indicate the position of the PDSCH transmission to the UE 110 within the RA response window implicitly or explicitly.

Returning to FIG. 4, also at S414 the scheduler 215 encodes the DCI for transmission to the UE 110 as a control channel message on the EPDCCH. As discussed herein, control channel messages are also referred to as EPDCCH transmissions, and a control channel message may include DCI for multiple different PDSCH transmissions including the DCI for the PDSCH transmission to UE 110. In one example, the eNB 105 may mask the DCI for the UE 110 using the RA-RNTI for the UE 110. In this example, the RA-RNTI may be calculated according to Equation (1) shown below.

$$\text{RA-RNTI} = 1 + t_{id} + 10 f_{id} \quad (1)$$

Still referring to FIG. 4, at S42, the eNB 105 (via the wireless interfaces or transceiver 220) sends the DCI to the UE 110 in the generated control channel message on the EPDCCH, and sends the RAR to the UE 110 in a RAR message on the PDSCH within the RA response window. The DCI for the UE 110 may be multiplexed (e.g., in time, frequency or code) with DCI for other UEs in the control channel message. Similarly, the RAR for the UE 110 may be multiplexed with RARs for other UEs in the RAR message. Additionally, the RAR message is multiplexed (e.g., in the time domain) with RAR messages including RARs for other UEs.

Upon receipt, the UE 110 examines the DCI included in the control channel message to determine the position (e.g., temporal position) of the RAR message including the RAR intended for the UE 110 in the RA response window. As mentioned above, the DCI may indicate the position of the RAR message implicitly or explicitly.

Once having obtained the position of the RAR message including the RAR intended for the UE 110 within the RA response window, the UE 110 decodes the RAR message at the determined position to obtain the RAR provided by the eNB 105 for the UE 110. In one example, the UE 110 decodes only the RAR message at the determined position to obtain the RAR provided by the eNB 105 for the UE 110. Although example embodiments are discussed with regard to a UE decoding a single RAR message, it should be understood that a UE may identify RAR messages at multiple positions that require decoding. In this example, the UE may decode RAR messages at each of the identified positions in the RA response window.

Once having obtained the RAR included in the RAR message from the eNB 105, the UE 110 and the eNB 105 continue the random access process by exchanging, for example, third and fourth messages (Msg3 and Msg4). In the context of the RRC connection shown in FIG. 4, the UE 110 and the eNB 105 exchange RRC Connection messages to establish a RRC session between the UE 110 and the wireless network using the resources granted by the eNB 105 in the obtained RAR.

In more detail, as shown in FIG. 4, at S44 the UE 110 sends a third message (Msg3, such as a RRC connection request message) to the eNB 105 using the resources granted to the UE 110 in the RAR intended for the UE 110, and at S46 the eNB 105 sends a fourth message (Msg4, such as a RRC connection setup message) to establish the RRC connection between the UE 110 and the eNB 105 in response to the third message from the UE 110.

As discussed above, the scheduler 215 may provide scheduling information for a RAR message including the RAR for a UE, such as UE 110, explicitly within the DCI. And, the DCI for the UE 110 may be multiplexed with DCI for other UEs in a control channel message transmitted on the EPDCCH. In one example, the scheduler 215 includes bits (also referred to indicator bits, position indicator information or position indicator bits) indicating the position of the PDSCH transmissions (or RAR messages) in the RA response window, which include the PDSCH repetitions for a UE's corresponding RAR message. The position indicator may include scheduling information found in a conventional DCI, in addition to the starting (or first) subframe of the PDSCH transmission carrying the RAR message and its number of repetitions.

In another example (e.g., as shown in FIG. 5), one DCI message may be provided per EPDCCH transmission, and multiple EPDCCH transmissions may be included within a subframe.

As mentioned briefly above, the scheduling information may indicate more than one position of a PDSCH transmission in the RA response window to a given UE if, for example, multiple RARs correspond to the same RA-RNTI, but different preambles.

According to at least one other example embodiment, the scheduler 215 may provide the scheduling information to the UE 110 implicitly, without explicit position indicator information in the DCI.

In one example, the scheduler 215 may provide the scheduling information for the UE 110 using the ECCE index (e.g., the $1^{st}$ ECCE index) of the EPDCCH candidate carrying the DCI for the UE 110. More specifically, the scheduler 215 may indicate the temporal position of the EPDCCH transmission for the UE 110 using the ECCE index (e.g., the $1^{st}$ ECCE index) of the EPDCCH candidate carrying the DCI for the UE 110. This example embodiment will be discussed in more detail below with regard to FIG. 7. Moreover, the discussions of these figures will again, in some cases, refer back to FIGS. 1-3. In this example, the RAR messages sent by the eNB during the RA response window have the same repetition level. However, this is not necessarily required.

Figure 7:
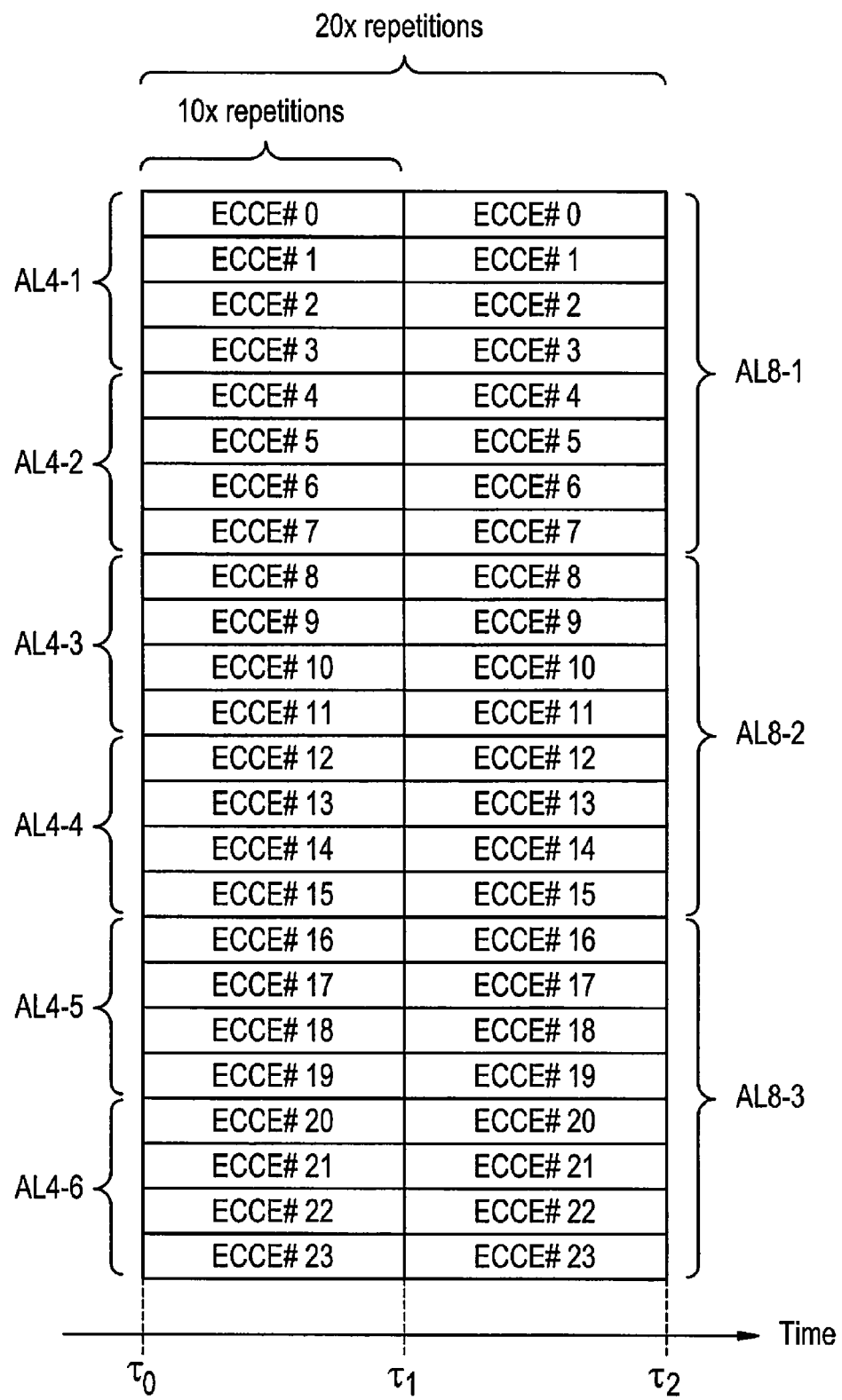
FIG. 7 illustrates example repetitions of EPDCCH transmissions in parallel, according to an example embodiment.

FIG. 7 illustrates an example of enhanced control channel elements (ECCEs) within a subband of 6 physical resource blocks (PRBs).

As is well-known, a resource element (RE) is the minimum resource unit in a 3GPP-LTE network, indicated by one orthogonal frequency-division multiplexing (OFDM) symbol in time domain and one subcarrier in frequency domain. An enhanced resource element group (EREG) contains 9 REs within the physical resource block. An enhanced control channel element (ECCE) usually contains 4 EREGs, which are distributed in a PRB pair (for localized transmission) or set of PRB pairs (for distributed transmission). The Enhanced Physical Downlink Control CHannel (EPDCCH) is built using these blocks. The number of ECCEs in a EPDCCH transmission is referred to as its aggregation level (AL), and may be 1, 2, 4, or 8 ECCEs (logical sequence).

In the example shown in FIG. 7, it is assumed that the Aggregation Level (AL) is the same for all RA-RNTIs and UEs, and the AL is one of 4 and 8. An AL of 4 corresponds to 6 EPDCCH candidates (and RA-RNTIs) per subband, and an AL of 8 corresponds to 3 EPDCCH candidates (and RA-RNTIs) per subband. Accordingly, in this example, the number of RAR messages in the RA response window is 6 for an AL of 4, and the number of RAR messages in the RA response window is 3 for an AL of 8. Each ECCE is assigned an index i, where i has a value between 0 and 23.

Referring to the example shown in FIG. 7, for an AL of 4 and assuming a repetition level of 20× repetitions, the 6 EPDCCH candidates may be given as shown below in Table 1.

TABLE 1

| Candidate AL4-1 | ECCE#0, ECCE#1, ECCE#2, ECCE#3 |
| Candidate AL4-2 | ECCE#4, ECCE#5, ECCE#6, ECCE#7 |
| Candidate AL4-3 | ECCE#8, ECCE#9, ECCE#10, ECCE#11 |
| Candidate AL4-4 | ECCE#12, ECCE#13, ECCE#14, ECCE#15 |
| Candidate AL4-5 | ECCE#16, ECCE#17, ECCE#18, ECCE#19 |
| Candidate AL4-6 | ECCE#20, ECCE#21, ECCE#22, ECCE#23 |

For an AL of 8 and assuming a repetition level of 10× repetitions, the 3 EPDCCH candidates may be given as shown below in Table 2.

TABLE 2

| Candidate AL8-1 | ECCE#0, ECCE#1, ECCE#2, ECCE#3, ECCE#4, ECCE#5, ECCE#6, ECCE#7 |
| Candidate AL8-2 | ECCE#8, ECCE#9, ECCE#10, ECCE#11, ECCE#12, ECCE#13, ECCE#14, ECCE#15 |
| Candidate AL8-3 | ECCE#16, ECCE#17, ECCE#18, ECCE#19, ECCE#20, ECCE#21, ECCE#22, ECCE#23 |

In the example shown in FIG. 7, it is also assumed that the repetition for the PDSCH carrying a particular RAR message is indicated in the DCI for the RAR message. Since all RAR messages have the same number of repetitions, once having determined the position of the RAR message in the RA response window based on the DCI for the RAR message, a UE is able to identify the subframe during which the PDSCH repetition begins based on the position of the RAR message.

In one example, with reference again to FIGS. 1-3, the scheduler 215 computes an index $I_{ECCE}$ of a first ECCE on which to begin sending the EPDCCH to the UE 110 based on the scheduling information for the PDSCH transmission to the UE 110. More specifically, the scheduler 215 computes the index $I_{ECCE}$ of the first ECCE on which to begin transmitting the EPDCCH to the UE 110 based on the position of the PDSCH transmission for the UE 110 in the RA response window.

In more detail, for example, the scheduler 215 computes the index $I_{ECCE}$ of the first ECCE on which to begin transmitting the EPDCCH to the UE 110 based on the position $P_{RAR}$ of the PDSCH transmission for the UE 110 in the RA response window and the AL of the EPDCCH candidates for the UE 110. In one specific example, the scheduler 215 may compute the index $I_{ECCE}$ according to Equation (2) shown below.

$$I_{ECCE} = P_{RAR} \lambda AL \tag{2}$$

In Equation (2), as mentioned above, $I_{ECCE}$ is the 1st ECCE index of the EPDCCH candidate for transmitting the DCI to the UE 110, and AL is the aggregation level of the EPDCCH candidates for the UE 110.

Referring back to the examples shown in FIGS. 6 and 7, since the AL of the EPDCCH candidates is 8, if the scheduler 215 schedules transmission of a RAR for a first UE (e.g., one of the UEs 110 in FIG. 1) at PDSCH transmission 602 (RAR#1) in the RA response window, then the scheduler 215 computes the index $I_{ECCE}$ of the first ECCE as ECCE#0 (i.e., $I_{ECCE}$=0×8=0). In this case, the scheduler 215 schedules the transmission of the DCI on the EPDCCH to the first UE beginning at ECCE#0.

If the scheduler 215 schedules transmission of the RAR for a second UE (e.g., another one of the UEs 110 in FIG. 1) at PDSCH transmission 606 (RAR#3) in the RA response window, then the scheduler 215 computes the index $I_{ECCE}$ of the first ECCE as ECCE#16 (i.e., $I_{ECCE}$=2×8=16). In this case, the scheduler 215 schedules the transmission of the DCI on the EPDCCH to the second UE beginning at ECCE#16. According to at least this example embodiment, the scheduler 215 is able to provide the scheduling information implicitly based on the wireless resources allocated for transmitting the DCI to respective UEs. In a more specific example, the scheduler 215 is able to convey the position of PDSCH transmissions for UEs implicitly using the wireless resources allocated for transmitting DCI to the UEs.

Still referring to the current example, upon receipt of EPDCCH transmissions from the eNB 105, each of the first and second UEs is able to determine the position of their corresponding PDSCH transmissions based on the wireless resources allocated for transmitting the EPDCCH carrying the DCI to the respective UEs. In a more detailed example, each UE identifies the position of its respective PDSCH transmission in the RA response window based on the AL of the EPDCCH candidates and the index $I_{ECCE}$ of the first ECCE of the EPDCCH candidate used to convey the DCI for the respective UE in the RA response window.

In a more detailed example, each of the first and second UEs may compute the position $P_{RAR}$ of its RAR message in the RA response window according to Equation (3) shown below.

$$P_{RAR} = \left\lfloor \frac{I_{ECCE}}{AL} \right\rfloor \tag{3}$$

In this example, if more than one RAR message position is identified (e.g., if two UEs are associated with the same RA-RNTI), then the floor of the RAR positions is taken as the position of the RAR message for the UE in this example.

A more detailed example of the process performed at the first and second UEs in response to receiving the DCI including implicit indication of the position of the corresponding PDSCH transmissions will now be described with regard to the example shown in FIG. 7 and the flow chart shown in FIG. 8. In this example, the same assumptions as those discussed above with regard to the implicit indication of the scheduling information by the eNB apply.

Figure 8:
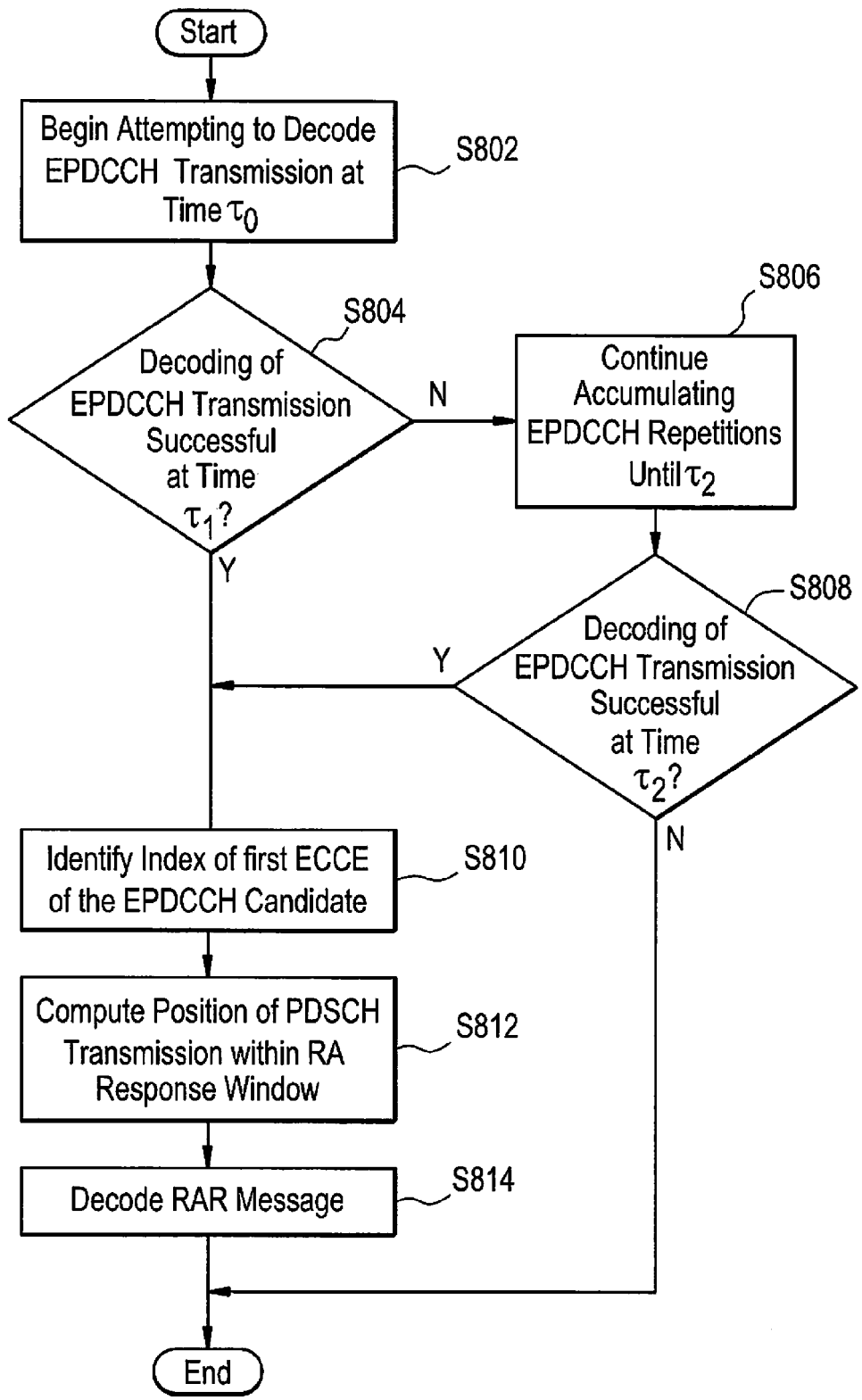
FIG. 8 is a flow chart illustrating a method for identifying a position of a PDSCH transmission, according to an example embodiment.

FIG. 8 is a flow chart illustrating a method for identifying a position of a PDSCH transmission, according to an example embodiment.

Referring to FIGS. 7 and 8, at step S802, and time $\tau_0$, both the first UE and the second UE mentioned above begin decoding the EPDCCH transmissions in parallel.

At step S804, and time $\tau_1$, after accumulating 10 repetitions of EPDCCH transmissions, both the first UE and the second UE attempt to decode DCIs using their respective RA-RNTIs (e.g., RA-RNTI#1 and RA-RNTI#2) for an AL of 8.

In this example, the AL has only reached 4 at time $\tau_1$, and thus, both the first and second UEs fail to decode any DCI (i.e., the attempt to decode the DCI by the first and second UE fails).

Since the attempt to decode the DCIs fails after accumulating 10 repetitions of EPDCCH transmissions, at step S806 the first and second UEs continue to accumulate EPDCCH repetitions until time $\tau_2$, at which each has accumulated 20 repetitions of EPDCCH transmissions.

At step S808, and at time $\tau_2$, the first and second UEs again attempt to decode DCIs using their respective RA-RNTIs for an AL of 8.

Since the AL has reached 8, the first UE is able to successfully decode a DCI using RA-RNTI#1 on candidate AL8-1 with $I_{ECCE}=0$, and the second UE is able to successfully decode a DCI using RA-RNTI#2 on candidate AL8-3 with $I_{ECCE}=16$. Thus, the first and second UEs are able to identify the indices of the first ECCE of their respective EPDCCH candidates at step S810.

After successfully decoding their respective DCIs, at step S812 the first UE and the second UE compute the position of their respective PDSCH transmissions (RAR messages) based on the wireless resources carrying their respective DCI. In more detail, for example, using Equation (3) discussed above the first UE determines the position $P_{RAR}$ of its PDSCH transmission as the first position in the RA response window $$\left(\text{i.e., } P_{RAR} = \left\lfloor \frac{I_{ECCE}}{AL} \right\rfloor = \left\lfloor \frac{0}{8} \right\rfloor = 0\right).$$

Also at step S812, the second UE determines the position of its PDSCH transmission as the third position in the RA response window $$\left(\left(\text{i.e., } P_{RAR} = \left\lfloor \frac{I_{ECCE}}{AL} \right\rfloor = \left\lfloor \frac{16}{8} \right\rfloor = 2\right)\right).$$

After determining the positions of their respective PDSCH transmissions, at step S814 the first and second UEs decode their respective PDSCH transmissions (e.g., 602 (RAR#1) at the first position, and 606 (RAR#3) at the third position in the example shown in FIG. 6) in the RA response window.

Returning to step S808, if the attempt to decode the DCI by the first and second UEs for an AL of 8 is not successful at time $\tau_2$, then the process terminates. In this case, the first and second UEs may perform preamble retransmission.

Returning to step S804, if the attempt to decode the DCI by the first and second UEs for an AL of 8 is successful at time $\tau_1$, then the process proceeds to step S810 and continues as discussed above, but for an AL of 4.

Although discussed with regard to Equations (2) and (3), example embodiments may utilize other functions to implicitly determine the position of RAR messages in the RA response window. Moreover, although this example embodiment is discussed as utilizing the $1^{st}$ ECCE index as the input, other ECCE indices such as the last ECCE index may also be used.

According to one or more example embodiments, the scheduler 215 may expand the load of the EPDCCH transmissions by assigning resources (e.g., subbands) to carry the EPDCCH transmissions for UEs as a function of the preamble and/or RACH resources used by the respective UEs to transmit the preamble to the eNB 105.

For example, if 4 subbands are defined for carrying EPDCCH transmissions including the DCI for corresponding RAR messages, the 64 preambles may be divided into 4 groups of preambles such that each group of preambles corresponds to a subband among the 4 subbands.

In this example, a UE (e.g., UE 110) is aware of the group of preambles from which the UE has selected its own preamble, and monitors (e.g., only) the subband associated with that group of preambles for subsequent EPDCCH transmissions from the eNB 105 in the RA response window.

In one example grouping, preambles #0 through #15 may constitute a first group; preambles #16 through #31 may constitute a second group; preambles #32 through #47 may constitute a third group; and preambles #48 through #63 may constitute a fourth group. In this example, UEs having preambles from among preambles #0 to #15 in the first group monitor a first subband for EPDCCH transmissions; UEs having preambles from among preambles #16 to #31 in the second group monitor a second subband for EPDCCH transmissions; UEs having preambles from among preambles #32 to #47 in the third group monitor a third subband for EPDCCH transmissions; and UEs having preambles from among preambles #48 to #63 in the second group monitor a fourth subband for EPDCCH transmissions.

In accordance with this example embodiment, the inventors have recognized that a subband may only contain DCI for a limited number of PDSCH transmissions, and in cases where the loading is relatively high, a bottleneck may occur in the EPDCCH resources. Having multiple subbands for EPDCCH transmissions to UEs within a RA response window may enable the eNB to respond to a higher number of UEs within the RA response window.

The scheduler 215 may also assign subbands on which to send EPDCCH transmissions as a function of RACH resources used by respective UEs to convey preambles to the eNB 105. As is known, RACH resources may include frequency, time and/or code resources.

In one example, two (uplink) subbands (e.g., two frequency resources) may be used by a UE to transmit the preamble to the eNB on the RACH, and 64 preambles (code resources) may be used within each subband (frequency resource). If, for example, a first UE and a second UE use different frequency resources (subbands) to transmit their respective preambles, but both use the same code resources (preambles), then the first UE and the second UE are effectively using different RACH resources. Accordingly, the first UE and the second UE may monitor different subbands for their respective EPDCCH transmissions, thereby expanding the capacity of the EPDCCH.

In still at least one other example embodiment, each RAR message may correspond to one RA-RNTI; that is, the RAR messages and RA-RNTIs may have a 1:1 correspondence. This is in contrast to the conventional art in which multiple RAR messages may correspond to the same RA-RNTI, and thus, a user equipment may have to decode multiple RARs to identify the RAR associated with the particular UE's preamble. At least this example embodiment enables UEs to, in at least some situations, limit blind decoding to only a single PDSCH transmission since the UE may stop the RACH process if the UE's preamble ID is not found in the RAR message corresponding to the RA-RNTI associated with the UE. In at least this example embodiment, RARs associated with the same RA-RNTI are multiplexed in the same RAR message. Advantageously, this multiplexing method may reduce the number of over repetitions.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A base station comprising:
   a processing circuit including a scheduler configured to schedule a plurality of physical downlink shared channel transmissions in parallel, a first physical downlink shared channel transmission, among the plurality of physical downlink shared channel transmissions, including a random access response for a first user equipment, and the plurality of physical downlink shared channel transmissions being scheduled for transmission to a plurality of user equipments during a random access response window, the scheduler further configured to generate downlink control information for the plurality of physical downlink shared channel transmissions to the plurality of user equipments, the downlink control information being indicative of positions of the plurality of physical downlink shared channel transmissions to the plurality of user equipments; and
   a transceiver circuit connected to the processing circuit, and configured to transmit the plurality of physical downlink shared channel transmissions to the plurality of user equipments during the random access response window, and to transmit parallel repetitions of physical downlink control channel transmissions including the downlink control information to the plurality of user equipments prior to the transmission of the plurality of physical downlink shared channel transmissions.

2. The base station of claim 1, wherein the downlink control information explicitly indicates the positions of the plurality of physical downlink shared channel transmissions to the plurality of user equipments within the random access response window.

3. The base station of claim 1, wherein the downlink control information includes indicator bits identifying the positions of the plurality of physical downlink shared channel transmissions within the random access response window.

4. The base station of claim 1, wherein the downlink control information implicitly indicates the positions of the plurality of physical downlink shared channel transmissions to the plurality of user equipments within the random access response window.

5. The base station of claim 1, wherein
   the scheduler is further configured to
      schedule a first physical downlink shared channel transmission by determining a temporal position of the first physical downlink shared channel transmission among the plurality of physical downlink shared channel transmissions within the random access response window, and
      assign wireless resources for sending the first physical downlink control channel transmission based on the determined temporal position for the first physical downlink shared channel transmission within the random access response window; and
   the transceiver is further configured to send the first physical downlink control channel transmission to a first user equipment using the assigned wireless resources.

6. The base station of claim 5, wherein
   the assigned wireless resources include a set of enhanced control channel elements; and
   the scheduler is further configured to
      compute an index of an enhanced control channel element in the set of enhanced control channel elements, and
      assign the set of enhanced control channel elements to the first physical downlink control channel transmission based on the computed index.

7. The base station of claim 6, wherein the scheduler is further configured to compute the index of the enhanced control channel element based on the temporal position of the first physical downlink shared channel transmission within the random access response window and an aggregation level for the first physical downlink control channel transmission.

8. The base station of claim 6, wherein the index of the enhanced control channel element in the set of enhanced control channel elements is an index of one of a first and last enhanced control channel element in the set of enhanced control channel elements.

9. A base station comprising:
   a processing circuit including a scheduler configured to schedule a plurality of physical downlink shared channel transmissions for a plurality of user equipments in response to preambles received from the plurality of user equipments on a random access channel, the scheduled plurality of physical downlink shared channel transmissions including random access responses for the plurality of user equipments, and the plurality of physical downlink shared channel transmissions being scheduled for transmission during a random access response window, the processing circuit further configured to generate downlink control information for the plurality of physical downlink shared channel transmissions to the plurality of user equipments, the downlink control information being indicative of positions of the plurality of physical downlink shared channel transmissions for the plurality of user equipments, and
      assign wireless resources to carry physical downlink control channel transmissions for the plurality of user equipments as a function of at least one of (i) the preambles received from the plurality of user equipments and (ii) random access channel resources used by the plurality of user equipments to transmit the preambles, the plurality of physical downlink control channel transmissions corresponding to the scheduled plurality of physical downlink shared channel transmissions; and
   a transceiver circuit connected to the processing circuit, and configured to send the plurality of physical downlink shared channel transmissions and repetitions of corresponding physical downlink control channel' transmissions to the plurality of user equipments during the random access response window, the repetitions of corresponding physical downlink control channel transmissions sent in parallel and prior to the plurality of physical downlink shared channel transmissions, the repetitions of corresponding physical downlink control channel transmissions including the downlink control information.

10. A user equipment comprising:
a processing circuit configured to
   determine a position of a random access response message for the user equipment within a random access response window based on downlink control information for the user equipment received over a physical downlink control channel, the downlink control information being indicative of the position of the random access response message for the user equipment, and
   decode the random access response message at the determined position within the random access response window to obtain a random access response for the user equipment; and
a transceiver connected to the processing circuit, the transceiver configured to
   receive a repetition of a physical downlink control channel transmission from among a plurality of parallel repetitions of physical downlink control channel transmissions, the repetition of the physical downlink control channel transmission including the downlink control information, and
   establish a radio resource connection based on the obtained random access response.

11. The user equipment of claim 10, wherein the downlink control information provides an explicit indication of the position of the random access response message to the user equipment.

12. The user equipment of claim 11, wherein
the downlink control information includes indicator bits identifying the position of the random access response message within the random access time window; and
the processing circuit is further configured to determine the position of the random access response message based on the indicator bits.

13. The user equipment of claim 10, wherein the downlink control information implicitly indicates the position of the random access response message within the random access response window.

14. The user equipment of claim 13, wherein the processing circuit is further configured to determine the position of the random access response message within the random access response window based on wireless resources used to transmit the downlink control information from the base station to the user equipment on the physical downlink control channel.

15. The user equipment of claim 14, wherein
the wireless resources include a set of enhanced control channel elements; and
the processing circuit is further configured to compute the position of the random access response message within the random access response window based on an index of an enhanced control channel element in the set of enhanced control channel elements.

16. The user equipment of claim 15, wherein the processing circuit is further configured to compute the position of the random access response message within the random access response window based on the index of the enhanced control channel element and an aggregation level for the physical downlink control channel.

17. The user equipment of claim 15, wherein the index of the enhanced control channel element in the set of enhanced control channel elements is an index of one of a first and last enhanced control channel element in the set of enhanced control channel elements.

18. The user equipment of claim 10, wherein the physical downlink control channel is an Enhanced Physical Downlink Control CHannel (EPDCCH).

19. The user equipment of claim 10, wherein the random access response message is received via the Physical Downlink Shared CHannel (PDSCH).

* * * * *